Oct. 3, 1961 C. P. GINSBURG ET AL 3,003,025

VIDEO RECORDER TAPE AND HEAD SPEED CONTROL SYSTEM

Original Filed July 25, 1955 3 Sheets-Sheet 1

CHARLES P. GINSBURG
SHELBY F. HENDERSON, JR.
RAY M. DOLBY
CHARLES E. ANDERSON
INVENTORS

BY [signature]

Oct. 3, 1961 C. P. GINSBURG ET AL 3,003,025

VIDEO RECORDER TAPE AND HEAD SPEED CONTROL SYSTEM

Original Filed July 25, 1955 3 Sheets-Sheet 2

CHARLES P. GINSBURG
SHELBY F. HENDERSON, JR.
RAY M. DOLBY
CHARLES E. ANDERSON
INVENTORS

BY Fehr Eng Swan

VIDEO RECORDER TAPE AND HEAD SPEED CONTROL SYSTEM

Original Filed July 25, 1955

CHARLES P. GINSBURG
SHELBY F. HENDERSON, JR.
RAY M. DOLBY
CHARLES E. ANDERSON
INVENTORS

BY Flehr & Swain

United States Patent Office
3,003,025
Patented Oct. 3, 1961

3,003,025
VIDEO RECORDER TAPE AND HEAD SPEED CONTROL SYSTEM

Charles P. Ginsburg, Los Altos, and Shelby F. Henderson, Jr., Portola Valley, Calif., Ray M. Dolby, Cambridge, England, and Charles E. Anderson, San Carlos, Calif., assignors to Ampex Corporation, Redwood City, Calif., a corporation of California Original application July 25, 1955, Ser. No. 524,004, now Patent No. 2,956,114, dated Oct. 11, 1960. Divided and this application July 21, 1958, Ser. No. 749,921
6 Claims. (Cl. 178—6.6)

This invention relates generally to electromagnetic tape systems, methods and apparatus, particularly to systems and methods of this character capable of recording and reproducing signal intelligence over a wide frequency spectrum, including for example, video frequencies.

This application is a division of copending application entitled "Broad Band Magnetic Tape System and Method," Serial No. 524,004, filed July 25, 1955, now Patent No. 2,956,114.

Various problems are involved when it is attempted to record and reproduce frequencies which occupy a wide frequency spectrum, as for example frequencies ranging higher than one megacycle, on magnetic tape. Assuming the use of reasonable tape speeds, conventional equipment is limited with respect to its usable frequency range. The recordable range can be increased by increasing the speed of the tape, but the speeds required for the recording of such high frequencies are such that the system becomes impractical because of the large amount of tape required for a given recording period. It is possible to reduce the linear tape speed by recording successive tracks extending laterally across the tape. Equipment for this purpose involves the use of magnetic record units which are mounted to sweep successively across the coated surface of the tape while the tape is being advanced in the direction of its length. While this arrangement makes it theoretically possible to provide relative speeds such that frequencies up to four megacycles or higher can be recorded, its application necessarily involves a number of problems. For example, the outputs of the several heads are subject to amplitude variations due to various causes such as lack of exact registeration on the recorded track, amplitude variations in the record because of slight variations in pressure between the several heads, and slight variations in the electrical characteristics of the heads. The conventional magnetic tape recording system, using currents varying in amplitude for application to the recording head, is particularly susceptible to undersired amplitude variations. The undesired signal variations cause distortion of the reproduced signal, and make it difficult, if not impossible, to reproduce the original frequency spectrum with reasonable fidelity, and particularly with sufficient fidelity to permit the recording and reproduction of television or like visual images.

In said copending application there is described and claimed a system which employs frequency modulation for recording and reproducing a wide frequency spectrum. The frequency modulation system permits the recording and reproduction of a wide frequency band with relative immunity to spurious variations in signal amplitudes.

Another of the problems involved in recording and reproducing a wide frequency spectrum is that of maintaining highly accurate speed control of the magnetic record units as they sweep across the tape and of the tape as it is driven past the same.

It is an object of the present invention to provide an improved means for controlling the speed of operation of the various parts of the recording system during recording and reproduction.

It is another object of the present invention to provide a system and method of the above character which when used for recording and reproduction of video frequency, makes possible the reproduction of visual images with good fidelity.

It is another object of the present invention to provide a system and method of the above character in which an intimate relation exists between the sweep of the magnetic record units and the motion of the tape past the same.

Additional objects and features of the invention will appear from the following description in conjunction with the accompanying drawings.

Referring to the drawings:

FIGURE 9 is a plan view schematically illustrating a piece of magnetic tape, and the track formed on the same.

Figure 1:
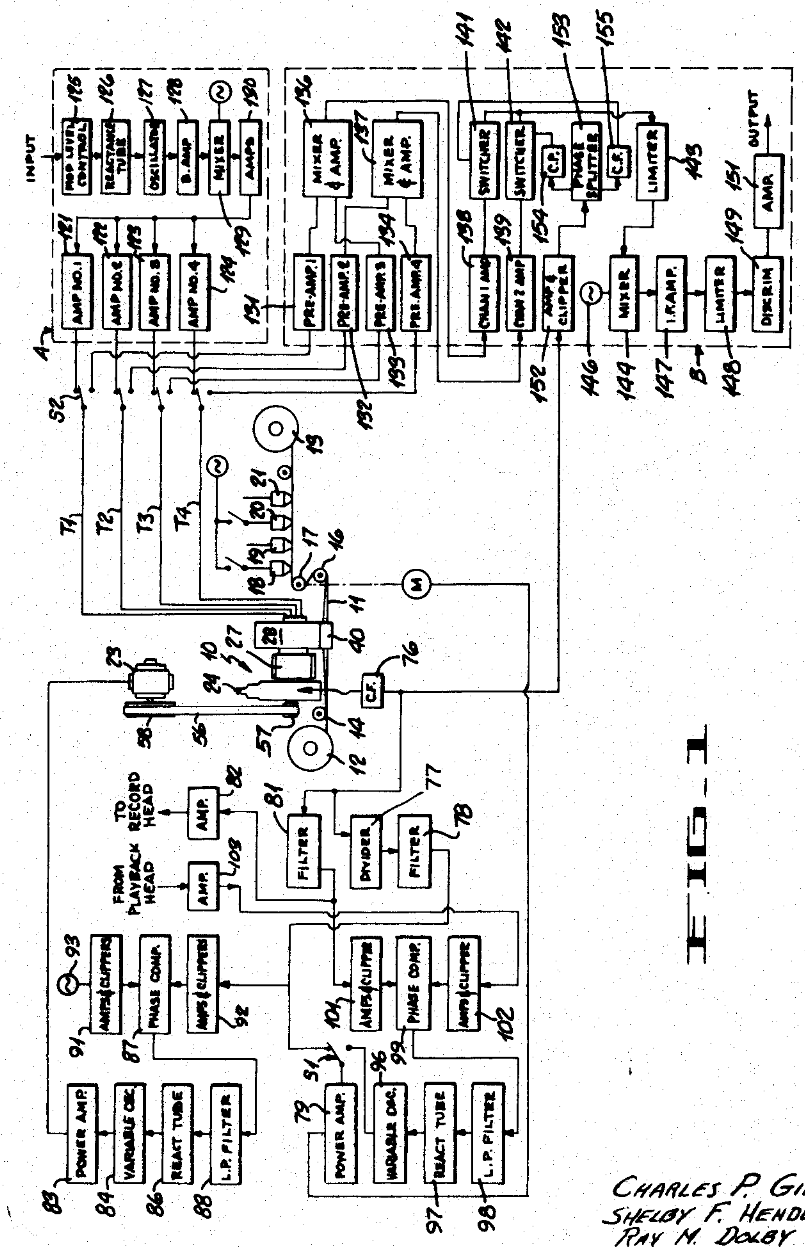
FIGURE 1 is a circuit diagram illustrating a complete recording and reproducing system incorporating the present invention.

The present system and method employs apparatus 10 (FIGURE 1) of the type having a plurality of record (i.e. transducer) units which are caused to sweep successively across a magnetic tape, as the tape is being moved in the direction of its length. Preferably, the sweep paths of the units are rectilinear, and the tape is cupped or curved to conform to the surface of a cylinder in the region where it is being contacted by the units. Suitable apparatus of this type is illustrated in FIGURES 2 to 6 inclusive. The transport means illustrated for carrying and feeding the tape includes conventional supply and take-up reels 12 and 13, which can be carried by suitable turntables. Guide studs or rollers 14 and 16, which are preferably flanged, are disposed to engage the tape at spaced distances from the operating end of the head assembly. The tape also engages a driving capstan 17, and for a purpose to be presently explained it is shown in contact with the magnetic heads 18, 19, 20 and 21, which operate upon the edges or margins of the tape. The tape employed is of substantial width compared to tape used with conventional magnetic equipment. For example, it may have a width of the order of 2 inches, and like magnetic tape now available on the market for sound recording equipment, it can consist of a pliable film of plastic material having a thin coating of magnetic material on one side of the same.

The magnetic head assembly is driven by an electric motor 23 either directly or through a belt drive as shown. Pulse generating means 24 is associated with the head and serves to generate pulses having a frequency dependent upon the speed of rotation of the head assembly. This means is used in conjunction with the speed control system.

Figures 2, 3, 4:
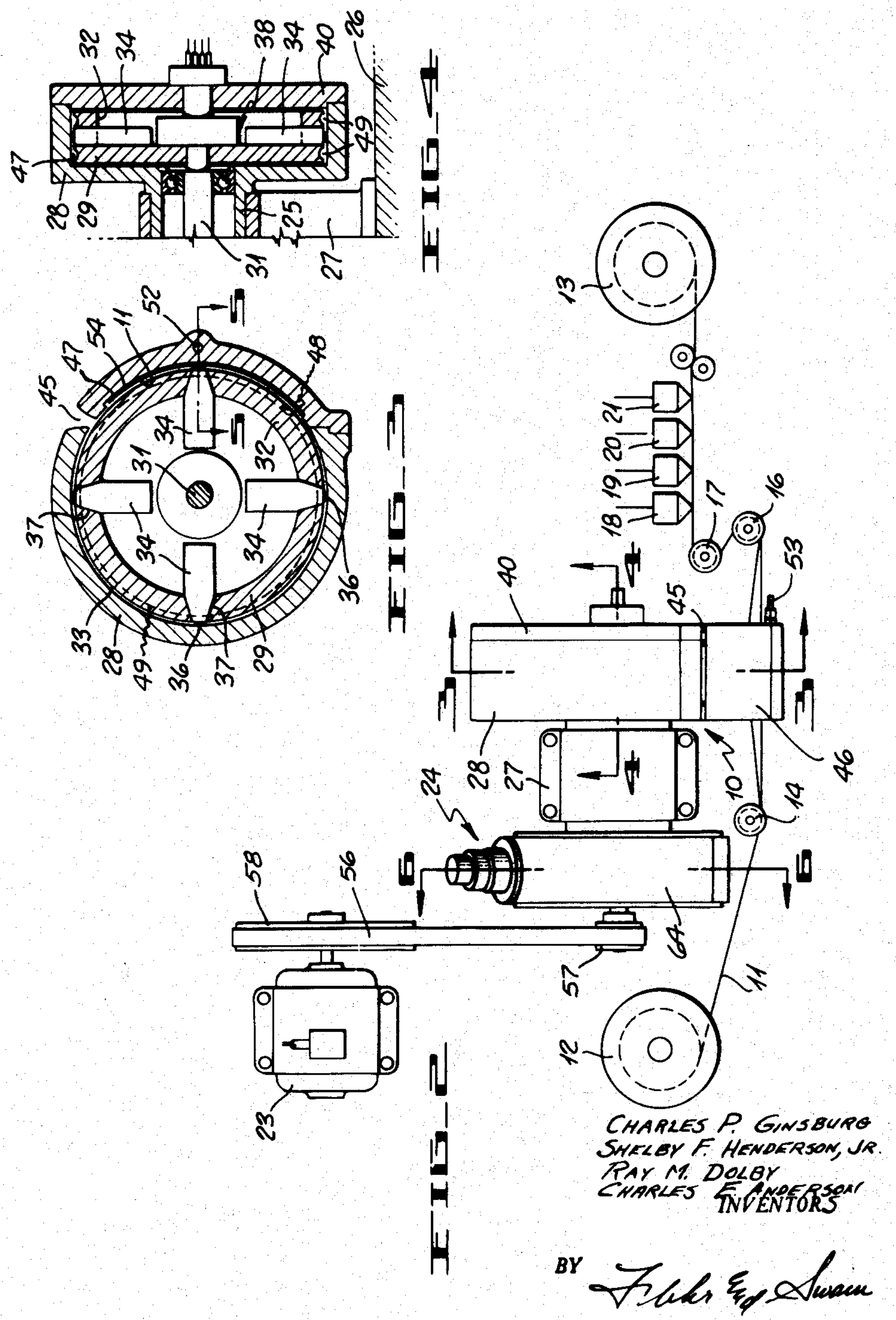
FIGURE 2 is a plan view schematically illustrating mechanism for mounting the magnetic heads and for transporting the tape.
FIGURE 3 is a cross-sectional view taken along the line 3—3 of FIGURE 2.
FIGURE 4 is a cross-sectional view taken along the line 4—4 of FIGURE 2.

To describe the rotary head assembly in greater detail, it consists of a stationary housing or shell 25 that is carried upon a mounting panel 26 by suitable means such as the base 27. The enlarged portion 28 of the shell encloses a rotatable member 29 that is carried by the shaft 31 (FIGURE 4).

Member 29 is provided with an annular rim 32 and is formed to provide a cylindrical peripheral surface 33 of substantial width. Member 29 serves to mount a plurality of magnetic transducer units 34. These units can be made according to known techniques and can consist, for example, of U-shaped magnetic core pieces having windings, and pole tips spaced by a thin non-magnetic gap, as for example a gap of the order of 0.0001 inch. The pole tips of each magnetic unit form the tip end 36 which extends slightly beyond the peripheral surface 33. The width of each tip as measured in a direction longitudinally of the shaft 31 should be relatively small, as for example 0.010 inch. Each magnetic transducer unit made as described above can be embedded in a body of plastic material to form the complete unit 34. The rim 32 is shown with a plurality of tapered slots 37 within which the units are accommodated in the manner illustrated in FIGURE 3. Suitable means can be used to hold the units in place.

Figure 8:
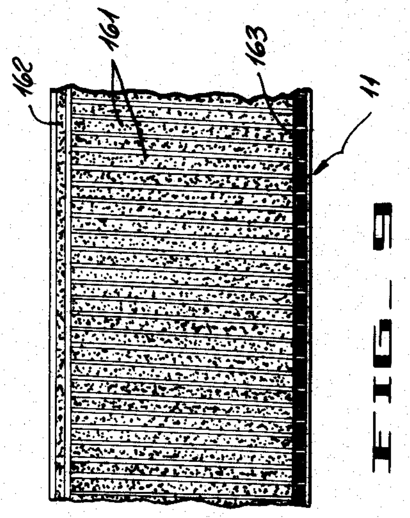
FIGURE 8 is a circuit diagram schematically illustrating the commutating means for making connection with the various magnetic head units.
Figure 8:
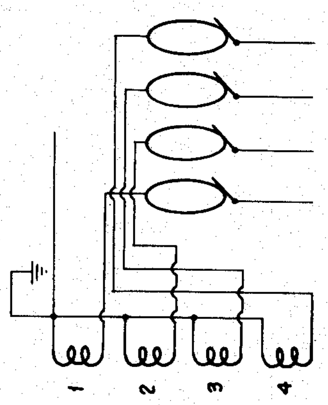

In FIGURE 8 the magnetic units are represented by coils 1, 2, 3 and 4. One side of each coil is grounded through the motor shaft and the other side is connected to a slip ring. The ground connection can be made through suitable means (not shown) such as a silver button on one end of the shaft which engages a grounded graphite brush. The brushes engaging the slip rings connect with output leads as will be presently described. The assembly 38 shown in FIGURE 4 is representative of a slip ring assembly which makes connection to the coils in the manner illustrated in FIGURE 8, and which provides four output leads. The enlarged shell portion 28 can be conveniently provided with a cover 40 which may mount the stationary part of assembly 38.

Figure 6:
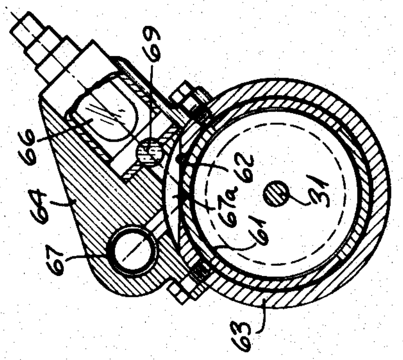
FIGURE 6 is a cross-sectional detail taken along the line 6—6 of FIGURE 2, and showing a suitable pulse generating means.
Figure 5:
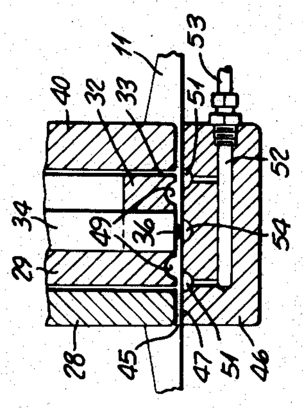
FIGURE 5 is an enlarged cross-sectional detail illustrating the guide means for the tape and manner in which the tape is contacted by the magnetic heads.

Special means is provided in conjunction with the head for bending that portion of the tape adjacent the head to arcuate form, whereby it conforms to the circular path through which the pole tips 36 pass. Thus, a stationary guide member 46 is provided which has an inner arcuate surface 47 (FIGURE 3). This surface conforms to the arc of a circle, the circle having a center coincident with the axis of shaft 31. The magnetic tape 11 is positioned between the surface 47 and peripheral surface 33 of the head. Application and removal of the tape is facilitated by providing an access slot 45 at the upper end of member 46. At one end of the surface 47, members 48 are provided to form shoulders for engaging the adjacent edge of the tape. The direction of rotation of the head is such that friction between the head and the tape urges the tape against the members 48. As illustrated in FIGURES 4, 5 and 6, the head can be provided with grooves 49 to accommodate the members 48.

In operation, physical contact is maintained between one side of the tape and the curved surface 47. To insure such contact, the arcuate surface 47 can be interrupted by the grooves 51 (FIGURE 5) which terminate short of the ends of the surface 47, and are connected to suitable evacuating means. Thus, in FIGURE 6 both grooves 51 are shown connected to the duct 52 and from thence to the tube 53. This tube can lead to a suitable evacuating chamber, which, in turn, is connected to an evacuating pump.

Maintenance of a partial vacuum or subatmospheric pressure in grooves 51 serves to apply pneumatic pressure to the tape in the direction to urge the tape into intimate contact with the surface 47. While the suction retaining means just described is deemed desirable, it is not essential and may be omitted.

Previous reference has been made to the fact that the pole tips 36 preferably extend a slight distance from the peripheral surface 33. As shown in FIGURE 5, the guide member 46 is provided with a circumferential groove 54 whereby the tape is not supported in the region of contact with the pole tips. This permits a slight amount of deflection of the tape at the region of contact to insure relatively uniform pressure of contact between the pole tips and the magnetic coating.

In the construction illustrated a part of the enlarged portion 28 of the shell 25 has been cut away to accommodate the guide member 46. Also, the guide member is shown mounted by attaching it directly to the shell.

The motor 23 may be directly connected to the shaft 31. However, in this instance we have reduced the speed requirements by providing a suitable drive connection. Thus, a drive belt 56 (FIGURE 2) is shown engaging a pulley 57 on the shaft 31, and a pulley 58 on the shaft of the motor 23. The belt can be one of the type made of nylon or like synthetic fabric.

Figure 7:
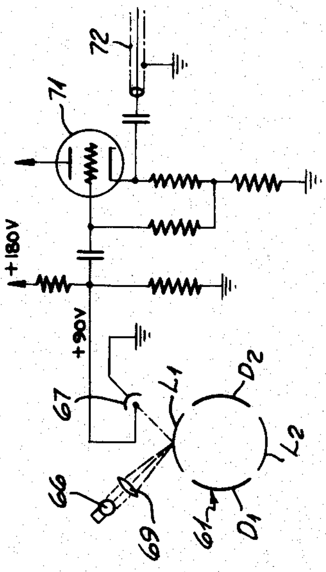
FIGURE 7 is a schematic view illustrating the pulse generating means and cathode follower which may be connected to the same.

The pulse generating means 24 can be one of the photoelectric type as shown in FIGURES 6 and 7. Thus, a wheel or drum 61 is carried by that end of the shaft 31 remote from the operating end of the head and provides a peripheral light reflecting surface 62. An enlarged shell portion 63 encloses the drum 61, and serves to carry the mounting block 64. Within the block 64 there is a lamp 66 and a photoelectric tube 67. The shell is cut away as indicated at 67*a* whereby light focused by lens 69 is directed upon the peripheral surface 62. Reflected light is directed upon photoelectric tube 67. The arrangement is such that the photoelectric tube receives reflected light from a small spot or point upon the peripheral surface 62. As shown particularly in FIGURE 7, the surface 62 is formed in equal segments which are alternately light and dark. In schematic FIGURE 7 the light areas are indicated as L1 and L2 and the dark areas as D1 and D2. As shown in FIGURE 7, the photoelectric tube 67 can be coupled to the input of vacuum tube 71, which is connected to operate as a cathode follower.

It will be evident that the pulse generating means described above will serve to generate a squarewave form, having a frequency directly dependent upon the speed of rotation of the shaft 31. As previously mentioned, this frequency is used in conjunction with the speed control system. In addition, it can be used for performing certain circuit switching functions in the reproducing system.

The apparatus described above operates as follows: Assuming that the shaft 31 is being driven at a constant speed by the motor 23, the capstan 17 is driven by another motor, and the magnetic tape is fed from left to right as shown in FIGURE 1, or in other words, at right angles to the plane of rotation of the magnetic units 34. That portion of the tape extending between the guides 14 and 16 is cupped or bent into arcuate form, and that part of the bent tape adjacent the guide member 46 is caused to contact the arcuate surface 47.

The pole tips 36 of the magnetic units are caused to successively contact and sweep across the magnetic tape. The rate of feed is such that successive swept areas are displaced longitudinally of the tape. The swept areas are rectilinear, and extend nearly at right angles to the length of the tape. The tape during its movement maintains contact with the members 48. As will presently be explained for recording operations the coils 1, 2 3 and 4 of the magnetic units are connected to means serving to supply a frequency modulated carrier. For reproducing operations the coils are connected to the input of a network including amplifying and demodulating means.

The apparatus described above requires proper speed control for both recording and reproducing operations. The complete system of FIGURE 1 incorporates means for controlling both the driving of the capstan and the driving of the head assembly. As illustrated in FIGURE 1, the block 76 represents the cathode follower 71, and is connected to the wave shaping filter 81 and the frequency divider 77. The divider serves to reduce the frequency of the pulses to a frequency convenient for operating the synchronous alternating current motor M (e.g. from 480 to 60 cps.), which is schematically indicated for driving the capstan. Thus, the output of the divider 77 is shown being passed through the filter 78, and from thence through switch S1 to the power amplifier 79. The output of this amplifier supplies current to the motor M. Filters 81 and 78 may be simple LC circuits tuned to the frequency being passed and serving to shape the wave to more nearly sine form.

The frequency of the pulse generating means is also recorded upon one margin of the tape, as a recorded control frequency. Thus, the cathode follower 76 is shown having its output connected to the filter 81, and the output of this filter connects with the amplifier 82 which, in turn, connects with the record head 19.

The motor 23 for driving the head assembly is supplied with alternating current from the power amplifier 83, which has its input connected to the variable oscillator 84. The variable oscillator includes suitable means such as the variable reactance tube 86, whereby the frequency of operation of the oscillator can be controlled by varying the value of a controlling voltage. The controlling voltage is applied to the reactance tube by the phase comparator 87, which connects to the reactance tube through the low pass filter 88.

The amplifiers and clippers 91 and 92 are both connected to the phase comparator 87. A suitable source 93 of reference frequency, such as the ordinary 60 cycle current supply, connects with the amplifiers and clippers 91. The amplifiers and clippers 92 connect to the output of the wave shaping filter 78. Assuming that the filter 78 supplies current at a frequency of 60 cps., and that the source 93 is nominally of the same frequency, then the controlling voltage developed by the phase comparator 87 is of a value dependent upon the amount of phase difference between the two applied alternating currents, namely that supplied from the reference and from the filter 78. The amplifiers and clippers 91 and 92 insure application of currents of the same amplitude to the phase comparator.

It will be evident from the foregoing that during a recording operation the frequency supplied by the pulse generating means is recorded as a control frequency along one margin of the tape, and a sub-multiple of this frequency, as for example 60 cps., is applied to the phase comparator 87, together with a like frequency supplied from the reference source 93. Phase differences cause a change in the control voltage applied by the phase comparator to the reactance tube 86, and thus causes compensating changes in the frequency supplied to the driving motor 23. This arrangement serves to compensate for mechanical deficiencies of the apparatus. If the motor driving the head drum tends to slow down or speed up due to changes in load or to other variations, a change in the control voltage developed by the phase comparator 87 causes a compensating change in the frequency supplied to the amplifier 83, and this, in turn, causes a compensating change in the speed of the motor 23.

For reproducing operations, switch S1 is shifted to connect the input of the amplifier 79 to the output of the variable oscillator 96. This oscillator includes the reactance tube 97, and is supplied through the low pass filter 98, with a controlling voltage from the phase comparator 99. The amplifiers and clippers 101 and 102 both apply signals of the same amplitude to the phase comparator 99. The amplifier and clipper 101 connects to the output of the wave shaping filter 81 and, therefore, receives a frequency corresponding to that generated by the pulse generator. The amplifier and clipper 102 connects to the output of amplifier 103, the input of which connects to the head 19, when used as a playback head in reproducing operations. During reproducing operations it is, therefore, apparent that the capstan motor M is under close control by virtue of the manner in which the frequency of the current from power amplifier 79, is determined by the frequency of operation of the variable oscillator 96. The variable oscillator, in turn, is controlled by the value of the controlling voltage supplied from the phase comparator 99, and such value is determined by the phase relationship between the frequency of the pulse generator, and the frequency derived from the previously recorded control frequency, by the head 19. It will be evident that this causes the motor M to drive the tape past the head assembly at a speed precisely the same as that used during recording, and if slight variations in such speeds occur during recording, the same variations will be applied during reproduction. During reproduction, the motor 23 is again controlled in the same manner as during recording.

In FIGURE 1 the electronics connected to the units of the head assembly, and used in recording, are indicated at A, and the electronics for playback or reproduction at B. For recording we have shown the record output amplifiers 121, 122, 123 and 124, having their outputs connected through the multiple switch S2, to the terminal leads T1, T2, T3 and T4 of the head assembly units. The broad band input, which may be video frequencies, is applied through the modulation level control 125 to a variable reactance tube 126 which modulates the frequency of the high frequency oscillator 127. By way of example, in a television system this oscillator may operate at a frequency of 45 megacycles. The output of the amplifier is passed through a buffer amplifier 128 and to a mixer 129. The output of a beat oscillator operating at a suitable frequency is also applied to the mixer, and in the case of a television system this may, for example, be one operating at a frequency of 41 megacycles. The resulting difference frequency, which is 4 megacycles for the frequencies cited above, is the center frequency that is amplified by amplifier 130, and fed to the record amplifiers 121, 122, 123 and 124, which drive the units of the rotary head through T1, T2, T3 and T4, respectively.

The electronics for reproduction consists in this instance of the preamplifiers 131—134, which have their inputs connected to contacts on the multiple switch S2. The outputs of pre-amplifiers 131 and 133 are shown applied to the mixer and amplifier 136, and similarly the outputs of amplifiers 132 and 134 are shown applied to the mixer and amplifier 137. The two channels represented by the outputs of amplifiers 136 and 137 are shown being separately amplified by the amplifiers 138 and 139, and applied to the switching or gating means 141 and 142. These switching devices are of the electronic type adapted to be controlled by application of a controlling voltage, to either block or pass current from the outputs of amplifiers 138 and 139. The outputs of the switching devices connect through the limiter 143, to the mixer 144. In the mixer 144 the frequencies from the limiter 143 are mixed with a frequency from the source 146, to provide intermediate frequencies which are supplied to the intermediate frequency amplifier 147. The output of amplifier 147 is supplied to the amplitude limiter 148, and then to the discriminator 149, for demodulation. The output of the discriminator is amplified at 151 to provide an output of the reproduced frequencies.

Controlling pulses are supplied to the switching devices 141 and 142, from the pulse generator. Thus, the output of the cathode follower 76 is also applied to the amplifiers and clippers 152 which connect with the phase splitter 153. Pulses from the phase splitter are applied through cathode followers 154 and 155, to the switching devices 141 and 142. As will be presently explained, the switching operation is such that the channels 138 and 139 are turned on and off alternately (i.e. made alternately effective). Therefore, during the sweep of a head unit across the tape, its corresponding channel is effective and the other channel is inoperative. The switching operation occurs shortly before a head leaves a record track and after a succeeding head has entered its record track. The outputs of the channels 138 and 139 are combined and merged in the output circuit of the switchers 141 and 142.

By way of example, where the speed of movement of each head assembly unit relative to the tape is of the order of 1700 inches per second, it is satisfactory to employ a center frequency of four megacycles. The frequency from source 146 applied to the mixer 144 can be of the order of 36 megacycles, thereby providing a center frequency of 32 megacycles for the intermediate frequency amplifier 147. For the speed of movement of the head units relative to the tape just specified by way of example, the frequency of four megacycles is near the upper frequency limit which can be effectively recorded by the use of conventional tape and head units of the magnetic type. For frequencies above four megacycles there is a rapid fall off in effective recording. However, the fall off is gradual, and is not an abrupt cut-off such as would cause undesirable effects. Therefore, in effect, we use vestigial sideband F–M recording, because sideband components substantially above four megacycles are not effectively recorded.

It will be evident to those familiar with television systems that an input of video frequencies may be obtained from a standard television receiver, or may be taken directly from the output of the camera chain. Similarly, the reproduced video output can be used to reproduce a visual image by utilizing an ordinary television receiver, including the synchronizing pulse and scanning auxiliaries, and the amplifying means ordinarily associated with the same. With the present system the synchronizing pulses can be recorded together with the video frequencies, and reproduced together with the video frequencies for proper control of the television receiver.

FIGURE 9 illustrates a portion of the magnetic tape 11 with record areas upon the same, assuming that the system is being used for the recording and reproduction of video frequencies. The areas 161 (exaggerated as to width and spacing) represent the rectilinear track areas which are swept by the magnetic head units, and these areas are slightly spaced apart in the direction of the length of the tape, and are disposed at an angle slightly less than 90° with respect to the length of the tape. By way of example, where the magnetic tape is two inches in width, each record area may have a width as measured lengthwise of the tape of 10 mils. Dotted lines 162 and 163 represent the demarcation between the tracks which carry the picture intelligence, and the marginal edge portions over which the erase heads are operated. As previously mentioned, head 18 operates as an erase head immediately in advance of the head 19, during recording. On the other margin of the tape, head 20 can be connected to a source of alternating current to function as an erase head, in advance of the head 21. Head 21 can be used for the recording of sound signals. Shortly before a head reaches the line 163, a succeeding head reaches the line 162. Switching operations (when employed) occur shortly before the heads reach the lines 163. In FIGURE 9 it is assumed that the lower marginal edge is being used for the recording of audio frequencies, and the upper margin for recording the control frequency. In both instances the erase operations performed by heads 18 and 20 eliminate most but not all of the track portions carrying duplicated picture information.

Assuming the use of the system for recording and reproducing video frequencies, the overall operation can be briefly reviewed as follows: Switch S1 is positioned as shown in FIGURE 1, and the rotary head assembly is started in operation by energizing the motor 23. The tape is driven by starting the motor M. The speed of operation of both motors is closely controlled in the manner previously described. The video input is applied to the modulation level control 125, and the desired frequency modulated carrier from the mixer 129 is applied to the amplifier 130, and from thence to the amplifiers 121, 122, 123 and 124, which energize the separate units of the rotary head assembly. The result is that as each head unit sweeps across the tape it records the frequency modulated carrier in the manner previously described. After the recording operation, the motors are deenergized and the tape wound back upon the supply reel 12 for a playback operation. After the rewind operation has been completed, the two motors are again started in operation and by virtue of the manner in which the motors are controlled the units are caused to accurately track upon the recorded areas. In addition, the speed of movement of each unit with respect to its track is controlled to be precisely the same as occurred during recording. The currents induced in the windings of the several head units are applied to the pre-amplifiers 131—134 and from thence to the amplifiers 136 and 137 and the amplifiers 138 and 139. The output from amplifiers 138 and 139, as alternately passed by the switchers 141 and 142, are combined and applied to the limiter 143 and mixer 144. The intermediate center frequency resulting from beating in the mixer 144, is amplified at 147 and after passing through the amplitude limiter 148, is applied to the discriminator 149. The resulting demodulation produces the original video frequencies at the output of the amplifier 151.

It will be evident that our system and method can be used wherever it is desirable to record a wide frequency spectrum ranging substantially higher than can be recorded by the use of conventional magnetic tape equipment. Particularly, the invention can be used with good results for recording and reproducing television or like visual images.

We claim:

1. In a system of the character described, a rotatable magnetic head assembly including a plurality of transducer units, a tape transport means for moving a magnetic tape in cooperative relation with the head assembly whereby the units sweep successively across the tape, means including a first alternating current motor of the synchronous type for driving the head assembly, means including a second alternating current motor of the synchronous type for moving the tape, pulse generating means associated with the head assembly and serving to generate pulses of a frequency dependent upon the speed of rotation of the head assembly, means for supplying current of variable frequency to said first motor, means for controlling the frequency of current supplied to said first motor, said last means including a phase comparator, a source of reference frequency applied to the comparator, and means for applying a frequency to the comparator dependent upon the speed of rotation of the head, means for supplying alternating current to the second motor at a frequency directly dependent upon the frequency of said pulse generating means, and means for recording on the tape a speed control frequency dependent upon the frequency of the pulse generating means.

2. In a system of the character described, a rotatable magnetic head assembly having a plurality of transducer units, tape transport means for moving a magnetic tape in cooperative relation with the head assembly whereby the units sweep successively across the tape, means including a first alternating current motor for driving the head assembly, means including a second alternating current motor for driving the tape, pulse generating means associated with the head assembly and serving to generate pulses of a frequency dependent upon the speed of rotation of the head assembly, means for reproducing a control frequency separately recorded upon the tape, oscillator means for supplying current of variable frequency to the first motor, means for controlling the frequency of said oscillator means comprising a phase comparator, a source of reference frequency applied to the phase comparator, and means for applying to the phase comparator a frequency directly dependent upon the speed of rotation of the head assembly, said phase comparator serving to vary the frequency of said oscillator means in accordance with the changes in the phase relationship between the frequencies applied to the same, a second oscillator means for supplying current of variable frequency to the second motor, means including a phase comparator for controlling said last named means, means for applying a frequency to said last named phase comparator directly dependent upon the reproduced speed control frequency and means for applying to said last named phase comparator a frequency directly dependent upon the speed of rotation of the head.

3. In a system of the character described, a rotatable magnetic head assembly including a plurality of transducer units, a tape transport means for moving a tape in cooperative relationship with the head assembly whereby the units sweep successively across the tape, means including a first alternating current motor for driving the head assembly, means including a second alternating current motor for moving the tape, generating means associated with the head assembly and serving to generate a signal whose frequency is dependent upon the speed of rotation of the head assembly, a source of signal having a reference frequency, means for supplying a current of variable frequency to said first motor, means responsive to the signal frequency dependent upon the speed of rotation of the head assembly and to the reference frequency signal for controlling the variable frequency supplied to said first motor, means for supplying an alternating current to the second motor at a frequency dependent upon the frequency of said signal frequency, and means for recording on the tape a speed control frequency dependent upon the signal frequency.

4. In a system of the character described, a rotatable magnetic head assembly having a plurality of transducer units, a tape transport means for moving a tape in cooperative relationship with the head assembly whereby the units sweep successively across the tape, means including a first alternating current motor for driving the head assembly, means including a second alternating current motor for driving the tape, generating means associated with the head assembly and serving to generate a signal having a frequency dependent upon the speed of rotation of the head assembly, oscillator means for supplying current of variable frequency to the first motor, means comprising a phase comparator for controlling the frequency of said oscillator means, a source of reference frequency applied to the phase comparator, and means for applying to the phase comparator said signal having a frequency directly dependent upon the speed of rotation of the head assembly, said phase comparator serving to vary the frequency of said oscillator means in accordance with changes in the phase relationship between the frequencies applied to the same.

5. In a system of the character described, a rotatable magnetic head assembly including a plurality of transducer units, a tape transport means for moving a magnetic tape in cooperative relationship with the head assembly whereby the units sweep successively across the tape, means including a first alternating current motor for driving the head assembly, means including a second alternating current motor for moving the tape, pulse generating means associated with the head assembly and serving to generate a signal at a frequency dependent upon the speed of rotation of the head assembly, an oscillator for generating current of variable frequency for application to said first motor, means for controlling the frequency of operation of said oscillator, said last-named means including a phase comparator, a source of reference frequency applied to the comparator, and means for applying a frequency to the comparator dependent upon the speed of rotation of the head assembly.

6. In a system of the character described for reproducing a magnetic tape recording of the type having recorded thereon a plurality of longitudinally spaced transverse signal information tracks and a longitudinal control frequency signal track, a rotatable assembly carrying a plurality of transducer units, a tape transport for moving the tape in cooperative relationship with the transducer units whereby the units sweep across the tape to reproduce the track having signal information, a transducer unit for reproducing the track having the control frequency signal, means including a first motor for driving the rotatable assembly, means including a second motor for moving the tape past the rotatable assembly, generating means associated with the rotatable assembly serving to generate a signal having a frequency directly dependent upon the rate of rotation of the rotatable assembly, means for supplying a current of variable frequency to said first motor, a source of reference frequency, signal means responsive to the signal frequency dependent upon the speed of rotation of the head assembly and to the reference frequency signal for controlling the variable frequency current supplied to said first motor, means for supplying an alternating current of variable frequencies to said second motor, means responsive to the signal frequency dependent upon the speed of rotation of the head assembly and the reproduced control signal for controlling the variable frequency supplied to said second motor.

References Cited in the file of this patent

UNITED STATES PATENTS 2,245,286 Marzocchi ____________ June 10, 1941
2,648,589 Hickman ______________ Aug. 11, 1953